United States Patent [19]
Lim

[11] Patent Number: 6,138,233
[45] Date of Patent: Oct. 24, 2000

[54] METHOD OF UPDATING A BIOS ROM

[75] Inventor: Ju-Hyung Lim, Seongnam, Rep. of Korea

[73] Assignee: SamSung Electronics Co., Ltd., Kyungki-do, Rep. of Korea

[21] Appl. No.: 09/159,495

[22] Filed: Sep. 23, 1998

[30] Foreign Application Priority Data

Sep. 23, 1997 [KR] Rep. of Korea ....................... 97-48205

[51] Int. Cl.[7] ............................ G06F 15/177; G06F 1/24
[52] U.S. Cl. ................................................ 713/1; 713/100
[58] Field of Search ..................................... 713/1, 2, 100

[56] References Cited

U.S. PATENT DOCUMENTS

| | | |
|---|---|---|
| 5,341,503 | 8/1994 | Gladstein et al. . |
| 5,388,267 | 2/1995 | Chan et al. . |
| 5,406,188 | 4/1995 | Myslinski et al. . |
| 5,424,722 | 6/1995 | Inada et al. . |
| 5,442,794 | 8/1995 | Wisor et al. . |
| 5,450,003 | 9/1995 | Cheon . |
| 5,454,710 | 10/1995 | Laudau et al. . |
| 5,455,499 | 10/1995 | Uskali et al. . |
| 5,473,775 | 12/1995 | Sakai et al. . |
| 5,477,129 | 12/1995 | Myslinski . |
| 5,493,685 | 2/1996 | Zenda . |
| 5,508,600 | 4/1996 | Myslinski et al. . |
| 5,519,843 | 5/1996 | Moran et al. . |
| 5,522,034 | 5/1996 | Watari et al. . |
| 5,522,076 | 5/1996 | Sewa et al. . |
| 5,532,945 | 7/1996 | Robinson ................................ 364/707 |
| 5,535,357 | 7/1996 | Moran et al. . |
| 5,579,522 | 11/1996 | Christeson et al. . |
| 5,630,142 | 5/1997 | Crump et al. . |
| 5,691,742 | 11/1997 | O'Connor et al. . |
| 5,748,972 | 5/1998 | Clark et al. . |
| 5,787,367 | 7/1998 | Berra .......................................... 701/1 |
| 5,870,520 | 2/1999 | Lee .................................... 395/182.04 |
| 5,944,821 | 8/1999 | Angelo .................................... 713/200 |

*Primary Examiner*—William Grant
*Assistant Examiner*—Ronald D Hartman, Jr.
*Attorney, Agent, or Firm*—Robert E. Bushnell, Esq.

[57] ABSTRACT

The present invention relates to a method of updating a new BIOS image of a BIOS ROM in a portable computer in a production line. The present invention comprises the steps of: determining whether the computer system is being powered only by a battery; determining whether the battery level is above a reference level when the computer system is powered only by the battery; updating a BIOS ROM by means of a flash utility program when the computer system is powered only by the battery and the battery level is above the reference level.

10 Claims, 3 Drawing Sheets

METHOD OF UPDATING A BIOS ROM

CLAIM OF PRIORITY

This application makes reference to, incorporates the same herein, and claims all benefits accruing under 35 U.S.C § 119 from an application entitled Method Of Updating A BIOS ROM earlier filed in the Korean Industrial Property Office on Sep. 23, 1997, and there duly assigned Serial No. 97-48205 by that Office.

BACKGROUND OF THE INVENTION

1. Field of the Invention

The present invention relates to a method of updating a BIOS ROM(basic input/output system read only memory), more particularly, the method of updating a BIOS image of a BIOS ROM in a portable computer in a production line.

2. Description of the Related Art

The BIOS is a program used by a microprocessor in a computer system for starting the computer system when power is turned on or reset. The ROM BIOS, or BIOS-ROM, is programmed by predetermined regulations so that sign on messages are displayed, i.e., a BIOS image, while performing a power-on-self-test (POST) after a power-on reset operation. The BIOS image typically includes the computer producer, information about the manufacturer of the ROM BIOS and the current version of the ROM BIOS. The BIOS also manages data flow between the computer's operating system and the hardware of the computer system. Once the computer system is successfully started it loads portions of the operating system for controlling the computer system into a random access memory (RAM) from a hard disk drive or a diskette drive. The ROM must be programmed with the BIOS prior to being installed into the computer during production and assembly. Often, these computers are to be customized for specific applications which requires that the BIOS be updated accordingly.

In order to change or update the BIOS it is known to use a flash memory which comprises write protected memory blocks and memory blocks which can be erased and rewritten. The following patents, incorporated herein by reference, describe the use of flash memories as ROM BIOS and further discuss updating, or refreshing, the ROM BIOS: U.S. Pat. No. 5,388,267 to Wai-Ming R. Chan, et al. entitled Method And Apparatus For Updating And Restoring System BIOS Functions While Maintaining BIOS Integrity; U.S. Pat. No. 5,473,775 to Makoto Sakai entitled Personal Computer Using Flash Memory As BIOS-ROM; U.S. Pat. No. 5,519,843 to Dov Moran, et al. entitled Flash Memory System Providing Both BIOS And User Storage Capability; U.S. Pat. No. 5,522,076 to Koichi Dewa, et al. entitled Computer System Having BIOS (Basic Input/Output System)-ROM (Read Only Memory) Writing Function; U.S. Pat. No. 5,535,357 to Dov Moran, et al. entitled Flash Memory System Providing Both BIOS And User Storage; and U.S. Pat. No. 5,579,522 to Orville H. Christeson entitled Dynamic Non-Volatile Memory Update In A Computer System.

I have determined, however, that there is a problem in updating the BIOS image in portable, or notebook, computer systems, because the updating procedure is frequently halted due to noise caused by an AC adapter being used in a production line.

SUMMARY OF THE INVENTION

It is an object of the present invention to provide a method of updating a BIOS ROM which can reduce the occurrence of noise, thereby reducing the number of times the updating procedure is halted in the production line, by using a battery being charged above a reference level when updating the BIOS image.

To achieve the object and in accordance with the purpose of the invention, as embodied and broadly described herein, a method of updating a BIOS ROM in a computer system using a battery and an AC power supply, comprises steps of determining whether the computer system is being powered by a battery or an AC adapter, determining whether a charge level of the battery is above a reference level when it is determined that the computer system is powered by a battery, and updating a BIOS ROM by means of a flash utility program when the computer system is powered only by a battery and the charge level is above the reference level.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Preferred embodiments of the present invention will become apparent from a study of the following detailed description with reference to the accompanying drawings.

Figure 1:
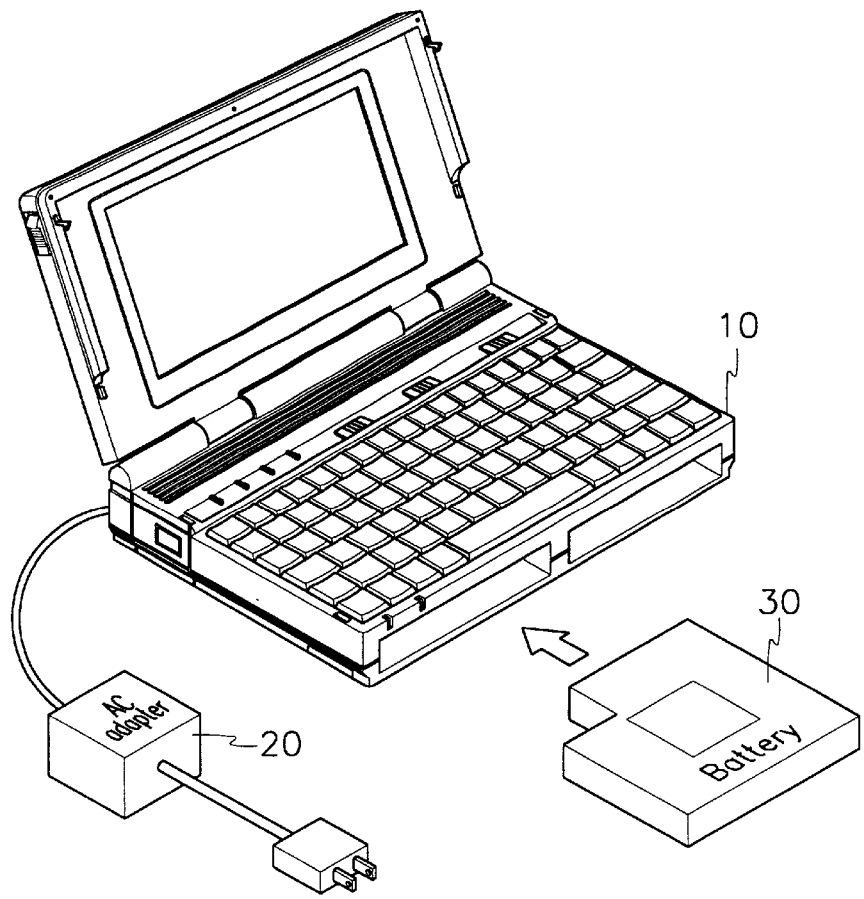
FIG. 1 is a perspective view of a portable computer.

FIG. 1 is a perspective view of a portable computer. As shown in FIG. 1, the computer system is powered by connecting an alternating current (AC) adapter 20 to the hind side of the main body 10 of the portable computer or mounting a battery 30 in a battery container formed at the fore side of main body 10. When updating a BIOS image of a BIOS ROM, AC-adapter 20 or battery 30 is used to supply power to the computer system. Here, the BIOS ROM 50, FIG. 2, has the BIOS image therein.

Figure 2:
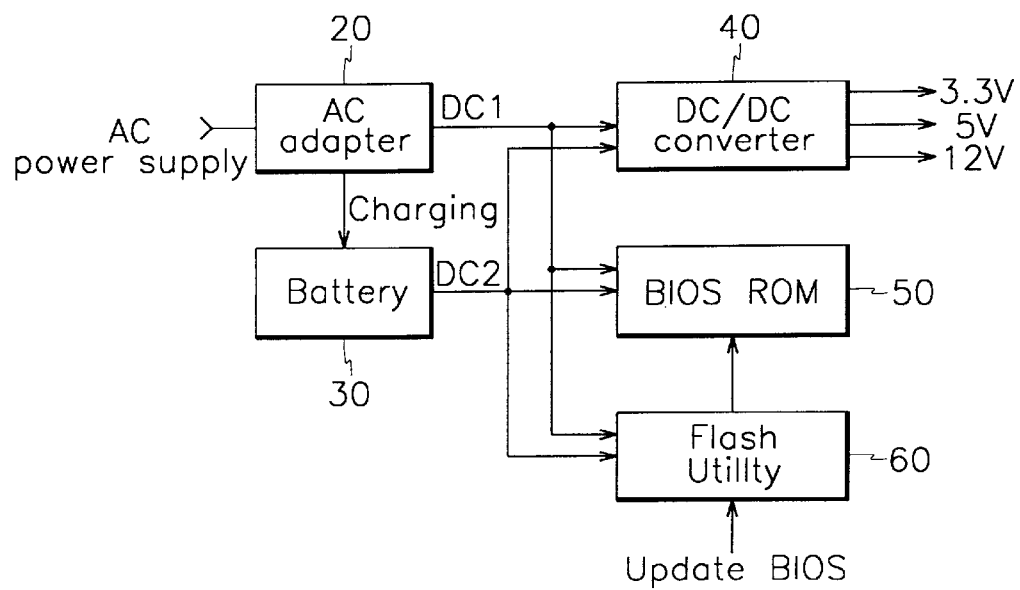
FIG. 2 is a block diagram of a device for updating a BIOS ROM.

FIG. 2 is a block diagram of a general device for updating BIOS ROM 50. As shown in FIG. 2, the general device for updating BIOS ROM 50 comprises AC adapter 20, battery 30, a DC/DC converter 40 and a flash utility 60 as a program.

AC adapter 20, which is a direct current power supply source (DC1) of the portable computer system, is used to operate the system or to charge battery 30. Typically, AC adapter 20 automatically senses an input voltage, ranging from 115 Vac to 230 Vac, and provides an output of +15V.

When AC adapter 20 is not connected, battery 30, capable of being connected and disconnected to/from main housing 10, is used as a 9.6V power supply source(DC2) for the portable computer system and allows the state of the computer system to be maintained, so that the information of the memory can be preserved. The charging of battery 30 is controlled by an integrated circuit (not shown) mounted on the system board. Namely, the integrated circuit controls the charging of the battery 30 by checking the contact state and the charging state of battery 30. The portable computer is powered by AC adapter 20 when the AC adapter is connected, and by the battery 30 when the AC adapter is not connected.

The DC/DC converter 40 converts the +15V output DC1 of the AC adapter 20 and the 9.6V output DC2 of the battery, and provides output voltages such as 3.3V, 5V and 12V required various components of the system board.

The BIOS of BIOS ROM 50 comprises software routines including a low-level routine for an input/output operation, and contains a BASIC interpreter which does not assist a disk or an advanced graphics.

BIOS ROM 50 is an EEPROM which is a memory capable of being electrically erased and being programmed again.

The flash utility program 60 is used when updating the BIOS image of BIOS ROM 50. Consequently, a new BIOS image is updated in the BIOS ROM by means of the flash utility program 60. Here, either AC adapter 20 or battery 30 supplies power to the computer system.

Figure 3:
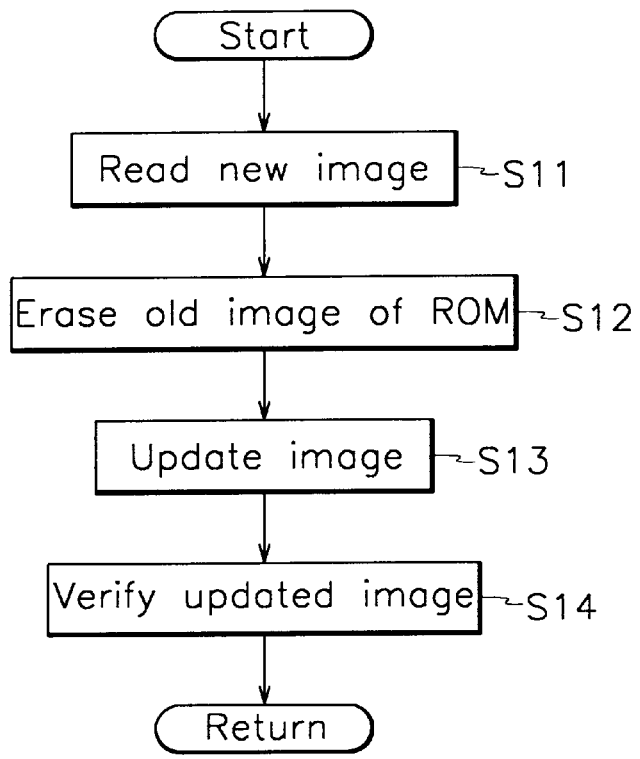
FIG. 3 is a flow chart illustrating a method of updating a BIOS ROM.

FIG. 3 is an exemplary flow chart illustrating a method of updating BIOS ROM 50. By means of flash utility program 60, the new BIOS image is read at step S11, the old image stored in BIOS ROM 50 is erased at step S12, the new BIOS image is updated in BIOS ROM 50 at step S13, and then in step S14 it is verified whether the updated BIOS image is all right.

In the present invention, the operation of flash utility program 60 for updating BIOS ROM 50 differs from the operation explained with respect to FIG. 3.

Figure 4:
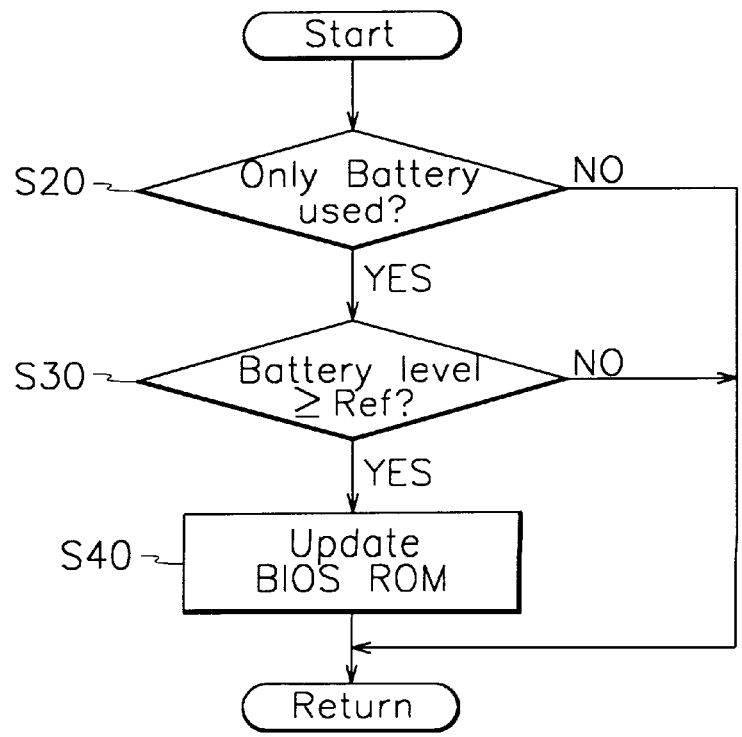
FIG. 4 is a flow chart illustrating a method of updating a BIOS ROM in accordance with the principle of the present invention.

As shown in FIG. 4, a method of updating a BIOS ROM comprises the steps of determining whether the power supply source is the battery in step S20, determining whether a charging level of the battery is greater than or equal to a reference level in step S30 when it is determined that the power supply source is the battery, and updating the BIOS image of the BIOS ROM in step S40 when it is determined that the charging level of the battery is greater than or equal to the reference level.

Figure 5:
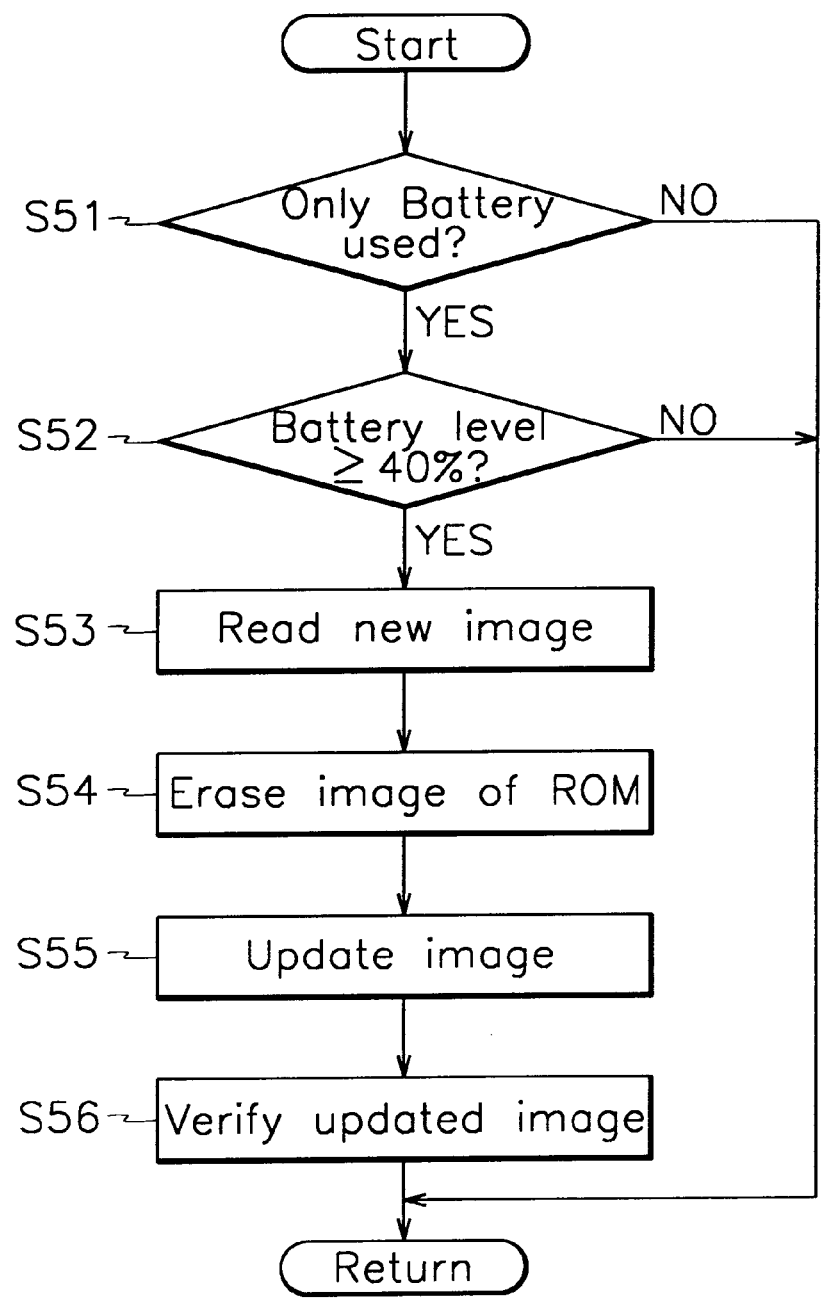
FIG. 5 is a flow chart illustrating a method of updating a BIOS ROM in accordance with an embodiment of the present invention.

As shown in FIG. 5, a method of updating a BIOS ROM in accordance with another embodiment of the present invention comprises the steps of: determining a power supply source, i.e., determining whether only the battery is being used as the power source, in step S51; determining whether the charging level of the battery is greater than or equal to a predetermined reference level in step S52, when it is determined that the battery is the power supply source; reading a new BIOS image from the flash utility program in step S53, when it is determined that the charging level of the battery is equal to or greater than the predetermined reference level; erasing an old BIOS image from the BIOS ROM in step S54; updating the BIOS ROM with the new BIOS image in step S55; and verifying the updated BIOS image in step S56.

According to the operation of the method of updating a BIOS ROM with respect to the embodiment shown in FIG. 5, first, it is determined whether the system is being powered by only the battery at step S51. Then, if the system is powered only by the battery, it is determined whether the charging level of the battery is above a predetermined reference level, i.e., 40% of a maximum charging level of the battery, at step S52.

Here, if it is determined that the AC adapter is the power supply source or that the battery charging level is below a 40% charging level and cannot be used to update the BIOS ROM due to the unreliability of the power supply, the flash utility program is terminated. However, if the power is supplied only by the battery and the battery level is above the 40% charging level, the flash utility program is executed in steps S53–S56 to update the BIOS ROM.

If the flash utility program is terminated because the battery charging level is below 40%, the user discontinues the updating of the BIOS ROM, and charges the battery or replaces the battery with another battery.

Next, by means of the flash utility program the flash utility program executed in steps S53–S56 to update the BIOS ROM, the new BIOS image is read at step S53, the old BIOS image in the BIOS ROM is erased at step S54, the newly read BIOS image is updated in the BIOS ROM at step S55 of updating a BIOS image, and then it is verified whether the updated BIOS image is all right at step S56.

Consequently, the BIOS image is updated only when the battery is used as a power supply and the checked battery level is equal to or greater than the reference level.

The effect of the present invention lies in that the productivity is improved since the number of system halts, occurring when updating the BIOS ROM in the portable computer in the production line, is reduced.

What is claimed is:

1. A method of updating a BIOS ROM, in a computer system using a battery and an alternating current power supply, comprising the steps of:

determining whether the computer system is being powered only by the battery;

determining whether a charging level of the battery is above a reference level, when it is determined that the computer system is being powered only by a battery;

updating a BIOS ROM by means of a flash utility program, when it is determined that the charging level of the battery is above the reference level.

2. The method of claim 1, wherein said reference level is 40% of a maximum charging level of said battery.

3. The method of claim 1, wherein said updating step comprises steps of:

reading a new BIOS image from the flash utility program, when it is determined that the charging level of the battery is above the reference level;

erasing an old BIOS image from the BIOS ROM;

updating the BIOS ROM with the new BIOS image; and verifying the new BIOS image updated into the BIOS ROM operates correctly.

4. The method of claim 3, wherein said reference level is 40% of a maximum charging level of said battery.

5. A method of updating a BIOS ROM, comprising the steps of:

determining whether a computer system is being powered a battery or an alternating current power supply via an alternating current adapter;

determining whether a charging level of the battery is not below a predetermined reference level, when it is determined that the computer system is being powered by the battery;

updating the BIOS ROM by means of a flash utility program, when it is determined that the charging level of the battery is not below the predetermined reference level.

6. The method of claim 5, wherein said predetermined reference level is 40% of a maximum charging level of said battery.

7. The method of claim 5, wherein said updating step comprises steps of:

reading a new BIOS image from the flash utility program, when it is determined that the charging level of the battery is not below the predetermined reference level;

erasing an old BIOS image from the BIOS ROM;

updating the BIOS ROM with the new BIOS image; and verifying the new BIOS image updated into the BIOS ROM operates correctly.

8. The method of claim 5, further comprising a steps of terminating said updating step when it is determined that computer system is being powered the alternating current power supply via the alternating current adapter, or when it is determined that the charging level of the battery is below the predetermined reference level.

9. The method of claim 8, wherein said predetermined reference level is 40% of a maximum charging level of said battery.

10. The method of claim 8, wherein said updating step comprises steps of:

reading a new BIOS image from the flash utility program, when it is determined that the charging level of the battery is not below the predetermined reference level;

erasing an old BIOS image from the BIOS ROM;

updating the BIOS ROM with the new BIOS image; and verifying the new BIOS image updated into the BIOS ROM operates correctly.

* * * * *